(12) United States Patent
Musgrove

(10) Patent No.: US 8,862,573 B2
(45) Date of Patent: Oct. 14, 2014

(54) SEARCH SYSTEM AND METHOD WITH TEXT FUNCTION TAGGING

(75) Inventor: Timothy A. Musgrove, San Jose, CA (US)

(73) Assignee: Textdigger, Inc., San Jose, CA (US)

( * ) Notice: Subject to any disclaimer, the term of this patent is extended or adjusted under 35 U.S.C. 154(b) by 699 days.

(21) Appl. No.: 11/730,930

(22) Filed: Apr. 4, 2007

(65) Prior Publication Data

US 2008/0059451 A1    Mar. 6, 2008

Related U.S. Application Data

(60) Provisional application No. 60/788,730, filed on Apr. 4, 2006.

(51) Int. Cl.
G06F 17/30 (2006.01)
G06F 15/16 (2006.01)

(52) U.S. Cl.
CPC ............... *G06F 17/30864* (2013.01)
USPC ........................................... 707/722

(58) Field of Classification Search
None
See application file for complete search history.

(56) References Cited

U.S. PATENT DOCUMENTS

| | | | |
|---|---|---|---|
| 4,839,853 A | 6/1989 | Deerwester et al. | |
| 5,210,868 A | 5/1993 | Shimada et al. | |
| 5,237,503 A | 8/1993 | Bedecarrax et al. | |
| 5,317,507 A | 5/1994 | Gallant | |
| 5,331,556 A | 7/1994 | Black, Jr. et al. | |
| 5,541,836 A | 7/1996 | Church et al. | |
| 5,619,709 A | 4/1997 | Caid et al. | |
| 5,675,819 A | 10/1997 | Schuetze | |
| 5,694,592 A | 12/1997 | Driscoll | |
| 5,873,056 A | 2/1999 | Liddy et al. | |
| 5,926,811 A | 7/1999 | Miller et al. | |
| 5,999,664 A | 12/1999 | Mahoney et al. | |

(Continued)

FOREIGN PATENT DOCUMENTS

| | | | |
|---|---|---|---|
| EP | 1846815 A2 | 10/2007 | |
| EP | 1851616 A2 | 11/2007 | |

(Continued)

OTHER PUBLICATIONS

Harith Alani, et al., "Associative and Spatial Relationships in Thesaurus-based Retrieval," Proceedings of the Fourth European Conference on Research and Advanced Technology for Digital Libraries, 2000, edited by J. Borbinha and T. Baker, Lecture Notes in Computer Science (Berlin: Springer), pp. 45-58.

(Continued)

*Primary Examiner* — Alex Gofman
(74) *Attorney, Agent, or Firm* — Nixon Peabody LLP

(57) ABSTRACT

A search system with a user interface module that generates a search engine results page including a listing of reference documents, each with a hyperlink to at least one secondary document relevant to the reference document. The search system also includes a text function tagger that parses text excerpts of the documents, and applies text function tags thereto. A secondary processing module is provided which identifies those secondary documents that have a text function tag that matches a text function tag of a reference document, so that selection of the hyperlink generates a display of secondary documents that are determined to at least have a text function tag that matches a text function tag of the reference document for which corresponding hyperlink was selected. A method and computer readable medium are also provided.

30 Claims, 3 Drawing Sheets

(56) References Cited

U.S. PATENT DOCUMENTS

| | | |
|---|---|---|
| 6,006,225 A | 12/1999 | Bowman et al. |
| 6,081,774 A | 6/2000 | de Hita et al. |
| 6,088,692 A | 7/2000 | Driscoll |
| 6,101,492 A | 8/2000 | Jacquemin et al. |
| 6,161,084 A | 12/2000 | Messerly et al. |
| 6,169,986 B1 | 1/2001 | Bowman et al. |
| 6,256,629 B1 | 7/2001 | Sproat et al. |
| 6,269,368 B1 | 7/2001 | Diamond |
| 6,360,215 B1 | 3/2002 | Judd et al. |
| 6,405,190 B1 | 6/2002 | Conklin |
| 6,453,315 B1 | 9/2002 | Weissman et al. |
| 6,460,029 B1 | 10/2002 | Fries et al. |
| 6,460,034 B1 | 10/2002 | Wical |
| 6,480,843 B2 | 11/2002 | Li |
| 6,510,406 B1 | 1/2003 | Marchisio |
| 6,519,586 B2 | 2/2003 | Anick et al. |
| 6,523,026 B1 | 2/2003 | Gillis |
| 6,523,028 B1 | 2/2003 | DiDomizio et al. |
| 6,601,026 B2 | 7/2003 | Appelt et al. |
| 6,647,383 B1 | 11/2003 | August et al. |
| 6,665,681 B1 | 12/2003 | Vogel |
| 6,675,159 B1 | 1/2004 | Lin et al. |
| 6,684,205 B1 | 1/2004 | Modha et al. |
| 6,735,583 B1 | 5/2004 | Bjarnestam et al. |
| 6,766,316 B2 | 7/2004 | Caudill et al. |
| 6,772,150 B1 | 8/2004 | Whitman et al. |
| 6,816,858 B1 | 11/2004 | Coden et al. |
| 6,847,979 B2 | 1/2005 | Allemang et al. |
| 6,865,575 B1 | 3/2005 | Smith et al. |
| 6,947,930 B2 | 9/2005 | Anick et al. |
| 7,024,400 B2 | 4/2006 | Tokuda et al. |
| 7,082,426 B2 | 7/2006 | Musgrove et al. |
| 7,089,236 B1 | 8/2006 | Stibel |
| 7,424,486 B2 | 9/2008 | Whitman et al. |
| 7,437,670 B2 | 10/2008 | Day et al. |
| 7,620,651 B2 | 11/2009 | Chea et al. |
| 7,844,589 B2 | 11/2010 | Wang et al. |
| 7,925,610 B2 | 4/2011 | Elbaz et al. |
| 2001/0037324 A1 | 11/2001 | Agrawal et al. |
| 2001/0049677 A1 | 12/2001 | Talib et al. |
| 2002/0046019 A1 | 4/2002 | Verhagen et al. |
| 2003/0018659 A1 | 1/2003 | Fuks et al. |
| 2003/0037041 A1 | 2/2003 | Hertz |
| 2003/0050915 A1 | 3/2003 | Allemang et al. |
| 2003/0115191 A1* | 6/2003 | Copperman et al. ............ 707/3 |
| 2003/0126235 A1 | 7/2003 | Chandrasekar et al. |
| 2003/0164844 A1 | 9/2003 | Kravitz et al. |
| 2003/0187837 A1 | 10/2003 | Culliss |
| 2003/0212654 A1 | 11/2003 | Harper et al. |
| 2003/0217047 A1 | 11/2003 | Marchisio |
| 2003/0217052 A1 | 11/2003 | Rubenczyk et al. |
| 2004/0059564 A1 | 3/2004 | Zhou |
| 2004/0064447 A1 | 4/2004 | Simske et al. |
| 2004/0133418 A1 | 7/2004 | Turcato et al. |
| 2004/0139059 A1 | 7/2004 | Conroy et al. |
| 2004/0143600 A1 | 7/2004 | Musgrove et al. |
| 2004/0236736 A1 | 11/2004 | Whitman et al. |
| 2005/0015366 A1 | 1/2005 | Carrasco et al. |
| 2005/0071332 A1 | 3/2005 | Ortega et al. |
| 2005/0080614 A1 | 4/2005 | Bennett |
| 2005/0080776 A1 | 4/2005 | Colledge et al. |
| 2005/0080780 A1 | 4/2005 | Colledge et al. |
| 2005/0165600 A1 | 7/2005 | Kasravi et al. |
| 2005/0216447 A1 | 9/2005 | Talib et al. |
| 2005/0267871 A1* | 12/2005 | Marchisio et al. ............ 707/3 |
| 2005/0283473 A1 | 12/2005 | Rousso et al. |
| 2006/0004747 A1 | 1/2006 | Weare |
| 2006/0161520 A1 | 7/2006 | Brewer et al. |
| 2006/0235843 A1 | 10/2006 | Musgrove |
| 2006/0235870 A1 | 10/2006 | Musgrove |
| 2007/0005590 A1 | 1/2007 | Thrasher |
| 2007/0011154 A1 | 1/2007 | Musgrove et al. |
| 2007/0078832 A1 | 4/2007 | Ott, IV et al. |
| 2007/0088695 A1 | 4/2007 | Bleyendaal et al. |
| 2007/0174041 A1 | 7/2007 | Yeske |
| 2007/0282811 A1 | 12/2007 | Musgrove |
| 2008/0021925 A1 | 1/2008 | Sweeney |
| 2008/0097985 A1 | 4/2008 | Olstad et al. |
| 2008/0154875 A1 | 6/2008 | Morscher et al. |
| 2009/0031236 A1 | 1/2009 | Robertson et al. |
| 2009/0037457 A1 | 2/2009 | Musgrove |
| 2009/0254540 A1 | 10/2009 | Musgrove et al. |

FOREIGN PATENT DOCUMENTS

| | | |
|---|---|---|
| EP | 1875336 A2 | 1/2008 |
| JP | 10-116290 A | 6/1998 |
| JP | 2000-339169 | 8/2000 |
| JP | 2000250919 | 9/2000 |
| JP | 2001184358 | 6/2001 |
| JP | 2008529173 A | 7/2008 |
| JP | 2008537225 A | 9/2008 |
| JP | 2008-538019 A | 10/2008 |
| WO | 2006086179 A3 | 8/2006 |
| WO | 2006096260 A3 | 9/2006 |
| WO | 2006110684 A3 | 10/2006 |
| WO | 2007081681 A2 | 7/2007 |
| WO | 2007114932 A3 | 10/2007 |
| WO | 2008097891 A3 | 8/2008 |
| WO | 2009059297 A1 | 5/2009 |

OTHER PUBLICATIONS

Douglas Tudhope, et al., "Augmenting Thesaurus Relationships: Possibilities for Retrieval," Journal of Digital Information, 2001, vol. 1, Issue 8, Article No. 41.

Eugene Charniak, "A Maximum-Entropy-Inspired Parser," in Proceedings of NAACL—2000, pp. 132-139.

Michael John Collins, "A New Statistical Parser Based on Bigram Lexical Dependencies," Proceedings of the 34th Annual Meeting of the Association for Computational Linguistics, 1996, Santa Cruz, CA, pp. 184-191.

Dekang Lin, "Dependency-Based Evaluation of Minipar," In Workshop on the Evaluation of Parsing Systems, May 1998, Granada, Spain.

Christiane Fellbaum, ed., "WordNet: An Electronic Lexical Database," 1998, MIT Press, ISBN 0-262-06197-X.

Daniel Gildea, et al., "Automatic Labeling of Semantic Roles," Computational Linguistics, 2002, vol. 28, No. 3, pp. 245-288.

Bethany Nowviskie, "COLEX: Semantic Collections & Exhibits for the Remixable Web," a preprint, Nov. 2005. http://www.nines.org/about/Nowviskie-Collex.pdf.

C.J. van Rijsbergen, "Information Retrieval," 2nd Edition, 1979, http://citeseer.ist.psu.edu.

International Search Report for PCT/US07/08428 dated Jul. 8, 2008.

"Synset." WordNet® 3.0, Princeton University, Jun. 25, 2009. <Dictionary.com, http:disctionary.reference.com/browse/synset>.

Dive Into Python, Chapter 9, XML Processing. Available at http://www.diveintopython.net/xml_processing/.

Agirre, E. et al., "Exploring Automatic Word Sense Disambiguation With Decision Lists and the Web", Dated 2000, 9 pages.

Barrington, L. et al., "Combining Audio Content and Social Context for Semantic Music Discovery", Paper presented at the 32nd Annual ACM SIGIR Conference, Jul. 19-23, 2009. http://cosmal.ucsd.edu/~lbarring/pubs/Barrington-SIGIR09.pdf.

Beneventano, D. et al., "Building an Integrated Ontology within SEWASIE System", Proceedings of the First International Workshop on Semantic Web and Data-bases (SWDB), 2003.

Bruce, R. et al., "Word-Sense Disambiguation Using Decomposable Models", Computing Research Lab and Department of Computer Science, New Mexico State University,1994, 8 pages.

Budura, A. et al., "Neighborhood-based Tag Prediction", 6th Annual European Semantic Web Conference ESWC2009, vol. 5554 of Lecture Notes in Computer Science, Jun. 2009, pp. 608-622. http://people.csail.mit.edu/pcm/papers/TagPrediction.pdf.

Chen, J-M. et al., "A Novel Approach for Enhancing Student Reading Comprehension and Assisting Teacher Assessment of Literacy", Computers & Education, vol. 55, Issue 3, Nov. 2010, pp. 1367-1382 (Abstract).

(56) References Cited

OTHER PUBLICATIONS

Durao, F. "Extending a Hybrid Tag-based Recommender System with Personalization", Paper presented, SAC '10 Proceedings of the 2010 ACM Symposium on Applied Computing, ACM New York, NY, USA 2010, pp. 1723-1727 (Abstract).
Guarino, N. "Formal Ontology and Information Systems", Proceedings of the International Conference on Formal Ontology in Information Systems (FOIS'98), Trento, Italy, 1998.
Gyllstrom, K. et al., "Seeing is Retrieving: Building Information Context from What the User Sees", Paper presented, IUI '08 Proceedings of the 13th International Conference on Intelligent User Interfaces, ACM New York, NY, USA 2008, pp. 189-198.
Hearst, M., "TextTiling: Segmenting Text into Multi-paragraph Subtopic Passages", Xerox PARC, Association for Computational Linguistics, 1997, pp. 33-64.
Hope, G. et al., "Convergence of Web 2.0 and Semantic Web: A Semantic Tagging and Searching System for Creating and Searching Blogs", International Conference on Semantic Computing, Sep. 1, 2007, pp. 201-208.
Itoh, H. et al., "Comparison and Superimposition Methods for Discovery of Relationship between Concept Systems", SIG-FAI-9904, Japan, Japanese Society for Artificial Intelligence, Mar. 21, 2000, pp. 65-70.
Joly, A. et al., "Contextual Recommendation of Social Updates, a Tag-based Framework", AMT, vol. 6335 of Lecture Notes in Computer Science, Springer 2010, pp. 436-447.
Leacock, C. et al., "Using Corpus Statistics and WordNet Relations for Sense Identification", Computational Linguistics, 24(1):147-165, 1998.
Martin, T., "Acquisition of Soft Taxonomies", IPMU-04, 2004.
Miller, G.A., "WordNet: A Lexical Database for English", Communications of the ACM, 38(11):39, 1995.
Ramakrishnan, G. et al., "Soft Word Sense Disambiguation", Department of Computer Science and Engineering, Indian Institute of Tech., Mumbai, India, Dated GWC 2004, pp. 291-298, Dec. 2003.
Sasumu, Akamine, "Flexible String Inversion Method for High-Speed Full-Text Search", Advanced Database Symposium '96, Information Processing Society of Japan, Dec. 2, 1996, vol. 96, No. 10, pp. 35-42.
Stamou, S., et al., "Retrieval Efficiency of Normalized Query Expansion", Computer Engineering and Informatics Department, Patras University, Research Academic Computer Technology Institute, 26221, Greece, CICLing 2005, LNCS 3406, pp. 604-607, Jan. 27, 2005.
Takeda, H., "The Present and the Future for Artifical Intelligence", Instrument and Control, Japan, The Society of Instrument and Control Engineers, Jun. 10, 2003, vol. 42, No. 6, pp. 508-511.
Turnbull, D. "Design and Development of a Semantic Music Discovery Engine", Dissertation Abstract, Publication No. 3320121, University of California, San Diego, Nov. 2008. Available at http://gradworks.umi.com/33/20/3320121.html.
Turnbull, D. et al., "Five Approaches to Collecting Tags for Music", Proceedings of the 9th International Conference on Music Information Retrieval, 2008, pp. 225-230.
Wang, X. et al., "Chinese Weblog Pages Classification Based on Folksonomy and Support Vector Machine" Autonomous Intelligent Systems: Multi-Agents and Data Mining (Jun. 3-5, 2007), pp. 309-321.
Yang, H. et al., "Bridging the WWW to the Semantic Web by Automatic Semantic Tagging of Web Pages", Fifth International Conference on Computer and Information Technology, Sep. 21, 2005-Sep. 23, 2005, pp. 238-242.
Yarowsky, D. "Unsupervised Word Sense Disambiguation Rivaling Supervised Methods", Department of Computer and Information Science, University of Pennsylvania, Philadelphia, PA, Jan. 27, 1995, pp. 189-196.
Office Action in U.S. Appl. No. 11/343,084, mailed Mar. 25, 2009.
Office Action in U.S. Appl. No. 11/343,084, mailed Sep. 30, 2009.
Office Action in U.S. Appl. No. 11/343,084, mailed Apr. 9, 2010.
Office Action in U.S. Appl. No. 11/343,084, mailed Nov. 22, 2010.
Office Action in U.S. Appl. No. 11/401,448, mailed Mar. 4, 2008.
Office Action in U.S. Appl. No. 11/401,448, mailed Nov. 6, 2008.
Office Action in U.S. Appl. No. 11/401,448, mailed Jun. 30, 2009.
Office Action in U.S. Appl. No. 11/401,448, mailed Mar. 5, 2010.
Office Action in U.S. Appl. No. 11/401,448, mailed Dec. 28, 2010.
Office Action in U.S. Appl. No. 11/401,448, mailed Sep. 13, 2011.
Office Action in U.S. Appl. No. 11/401,448, mailed Apr. 10, 2013.
Office Action in U.S. Appl. No. 11/401,448, mailed Dec. 9, 2013.
Office Action in U.S. Appl. No. 11/648,901, mailed Dec. 31, 2008.
Office Action in U.S. Appl. No. 11/648,901, mailed Oct. 27, 2009.
Office Action in U.S. Appl. No. 11/648,901, mailed Dec. 21, 2010.
Office Action in U.S. Appl. No. 11/648,901, mailed Sep. 21, 2011.
Office Action in U.S. Appl. No. 11/648,901, mailed Mar. 26, 2012.
Office Action in U.S. Appl. No. 11/648,901, mailed Oct. 15, 2012.
Office Action in U.S. Appl. No. 11/648,901, mailed May 23, 2013.
Notice of Allowance in U.S. Appl. No. 11/648,901, mailed Nov. 27, 2013.
Notice of Allowance in U.S. Appl. No. 11/648,901, mailed Feb. 4, 2014.
Office Action in U.S. Appl. No. 11/343,083, mailed Feb. 21, 2008.
Office Action in U.S. Appl. No. 11/343,083, mailed Nov. 10, 2008.
Office Action in U.S. Appl. No. 11/343,083, mailed Mar. 23, 2009.
Office Action in U.S. Appl. No. 11/343,083, mailed Sep. 25, 2009.
Office Action in U.S. Appl. No. 11/343,083, mailed Jun. 4, 2010.
Office Action in U.S. Appl. No. 11/343,083, mailed Feb. 8, 2011.
Office Action in U.S. Appl. No. 12/025,200, mailed May 11, 2010.
Office Action in U.S. Appl. No. 12/025,200, mailed Jan. 19, 2011.
Office Action in U.S. Appl. No. 12/025,200, mailed Oct. 17, 2011.
Office Action in U.S. Appl. No. 12/025,200, mailed Sep. 12, 2012.
Office Action in U.S. Appl. No. 12/025,200, mailed Oct. 31, 2013.
Notice of Allowance in U.S. Appl. No. 12/025,200, mailed Jan. 2, 2014.
Office Action in U.S. Appl. No. 12/263,943, mailed Dec. 20, 2013.
Office Action in U.S. Appl. No. 12/263,943, mailed Aug. 15, 2012.
Office Action in U.S. Appl. No. 12/607,767 mailed Jun. 9, 2011.
Office Action in U.S. Appl. No. 12/263,943, mailed Jun. 7, 2011.
International Preliminary Report on Patentability for PCT/US2006/003312, mailed on Oct. 25, 2007.
International Search Report for PCT/US2006/003312, dated Sep. 24, 2007.
International Preliminary Report on Patentability for PCT/US2006/013369, mailed on Apr. 9, 2009.
International Search Report for PCT/US2006/013369, dated May 21, 2008.
International Preliminary Report on Patentability for PCT/US2007/00025, mailed on Jul. 17, 2008.
International Search Report for PCT/US2007/00025, dated Feb. 13, 2008.
International Preliminary Report on Patentability for PCT/US2007/08428, mailed on Oct. 16, 2008.
International Search Report for PCT/US2007/08428, dated Jul. 8, 2008.
Japanese Office Action in Application No. 2007-553342, dated Jul. 4, 2011.
Japanese Final Office Action in Application No. 2007-553342, dated Mar. 26, 2012.
Japanese Final Office Action in Application No. 2007-553342, dated Sep. 3, 2012.
Japanese Refusal in Application No. 2007-553343, dated Jan. 5, 2012.
Japanese Final Refusal in Application No. 2007-553343, dated Aug. 20, 2012.
International Search Report for PCT/US200852893, dated Jul. 23, 2008.
International Preliminary Report on Patentability for PCT/US200852893, mailed on Aug. 4, 2009.
International Search Report for PCT/US2008/082250, dated Dec. 30, 2008.
International Preliminary Report on Patentability for PCT/US2008/082250, mailed on May 4, 2010.
U.S. Appl. No. 12/607,767 mailed on Oct. 28, 2009.
U.S. Appl. No. 14/192,177, filed Feb. 27, 2014.

(56) References Cited

OTHER PUBLICATIONS

International Search Report for PCT/US200603313, dated Oct. 2, 2007.

International Preliminary Report on Patentability for PCT/US200603313, mailed on Oct. 23, 2007.

Advisory Action in U.S. Appl. No. 11/648,901, mailed Feb. 2, 2010.

* cited by examiner

SEARCH SYSTEM AND METHOD WITH TEXT FUNCTION TAGGING

This application claims priority to U.S. Provisional Application No. 60/788,730 filed Apr. 4, 2006, the contents of which are incorporated herein by reference.

BACKGROUND OF THE INVENTION

1. Field of the Invention

The present invention is directed to search systems and methods that facilitates identification and retrieval of additional electronic documents associated with a reference document provided in a search results page. More specifically, the present invention is directed to a search system and method that uses text function tagging.

2. Description of Related Art

Electronic searching across large document corpora is one of the most broadly utilized applications on the Internet, and in the software industry in general. Regardless of whether the sources to be searched are a proprietary or open-standard database, a document index, or a hypertext collection, and regardless of whether the search platform is the Internet, an intranet, an extranet, a client-server environment, or a single computer, searching for a few matching texts out of countless candidate texts, is a frequent need and an ongoing challenge for almost any application.

One fundamental search technique is the keyword-index search that revolves around an index of keywords from eligible electronic documents. In this method, a user's inputted query is parsed into individual words (optionally being stripped of some inflected endings), whereupon the words are looked up in the index, which in turn, points to electronic documents or items indexed by those words. Thus, the potentially relevant electronic documents are identified and displayed for the user, generally in a sequenced fashion which is ordered based on supposed relevancy of the document to the search query. This sort of search service, in one form or another, is accessed countless times each day by many millions of computer and Internet users, and it is the basis of the Internet search services provided by Lycos®, Yahoo®, and Google®, used by tens of millions of Internet users daily.

Whenever users perform keyword searches over large document collections, they usually are left wanting more of relevant electronic documents than those identified in the initial search results and displayed on a search engine results page ("SERP). A common method of assisting users in this predicament is to provide hyperlinks associated with each of the particular "hits" (i.e. particular documents identified) on the SERP. Upon selection of this hyperlink, the user interface typically displays another page with additional electronic documents that are supposedly relevant to the document for which the hyperlink was selected. This optional feature is generally implemented by providing a "More like this" or "Similar pages" hyperlink placed immediately next to the hyperlink of each document in the SERP.

Typically, upon selection of such "Similar pages" link, the search engine identifies and displays additional electronic documents that have surface characteristics in common with the document identified for which the "Similar pages" link was selected. The common characteristics between the displayed document and the additional documents may include identical or similar content words in their title, and/or presence of identical or similar keywords submitted in the user's search query. If a topic category is known, the additional documents identified may be required to match the category of the reference document as well.

Many search engines and systems that implement such "Similar pages" feature for identifying and displaying additional documents to the user suffer from identifying documents which are not really relevant to the reference document. In particular, there are problems with recommending documents in an overlapping domain or category, even when they share many similar keywords of a user's search query. For example, an automobile website concerning the history of automobiles, and another website concerning their repair, may both be members of the same general domain of "automobiles," and may both share common keywords such as "Ford," "performance," and "engine," despite one being completely irrelevant to users' interests in the other sub-domain. Thus, the actual relevance of the additional documents identified and displayed may be very low, and not very helpful to the user.

Therefore, there exists an unfulfilled need for a search system and method that addresses the above identified limitations of conventional search engines and "Similar pages" feature used in such conventional search engines. In particular, there exists an unfulfilled need for a search system that recommends to the user, additional documents which are relevant to the main document for which a "Similar pages" link is selected, rather than recommending irrelevant documents.

SUMMARY OF THE INVENTION

In seeking to provide a search system and method that addresses the above identified limitations of conventional search engines and "Similar pages" feature, the inventor of the present application recognized that the limitations of conventional search systems and methods are generally due to an insufficient model of semantic context, and from an inability to transport that context across taxonomies. The inventor recognized that when users select "Similar pages" hyperlinks associated with particular documents displayed on a search engine results page (SERP), the users are not making this selection merely based on the link of the reference document displayed in the SERP. Instead, the users are likely making this selection taking into consideration a text excerpt such as a sentence or a snippet (i.e. a small portion of a sentence) from the reference document that is displayed for the user in the SERP next to, or below, a hyperlink to the reference document itself. The text excerpt, sparse though it may be, provide a crucial semantic context. Thus, the present inventor recognized that the text excerpt such as the sentence or snippet can be analyzed to guide, or filter, the recommendation of other additional documents for the user.

Usually, the only "model" of these contexts is a vector of keywords contained in the sentences or snippets of the text excerpts. While being helpful in many cases, such a limited model under-utilizes the available context of the user's action of clicking the "Similar pages" hyperlink, and tends produce results exhibiting much of the same limitations and deficiencies as the original keyword search. This is largely due to the fact that identification of the additional documents which are supposedly relevant to the reference document is based on much the same methodology, for example, finding identical or similar content words in titles of the additional documents, and/or presence of identical or similar keywords of the user's search query within the additional documents.

However, to provide improved utility and function to the user, the search system should identify and retrieve only those documents that match the search query words for, and also ensure that the documents also belong to an overlapping domain with the domain of the reference document. In addition, the search system should also consider some thematic elements of the text excerpt corresponding the user's request. This would enhance the relevance of the additional documents that are identified and displayed to the user by the search system upon selection of the "Similar pages" hyperlink associated with a particular document.

To accomplish the above, a full-scale parser and a semantic role analyzer may be applied to the documents to extract a rich set of semantic roles which can then be used to identify truly relevant additional documents. However, there are several pragmatic considerations that should be considered for this described solution which makes such use of a full-scale parser and a semantic role analyzer prohibitive for application in a search systems that executes broad, large scale searches for average users.

In particular, there are constraints on accessing the full text of documents referenced in the SERP. Full document text is, for all practical purpose, not available to the search engine for identifying the additional documents that are relevant to the reference document, the documents being retrieved based on indexed key search query terms. In addition, even if the full text was available for analysis, because of the amount of parsing required, real-time latency would increase dramatically. The time required to display a SERP in response to a query would be unacceptable to most users. In order to minimize such latency, computing capacity could be increased. However, this would substantially increase cost of the search system, and some of the latency would still likely exist.

Another solution option would be to establish an ontologically faceted collection ahead of time so that each document is further cross-referenced to other documents as well as key search query terms. This would allow cross-referenced documents to be quickly be identified and displayed as additional documents relevant to a selected particular reference document. However, this solution requires a substantial editorial investment, and significantly increases costs. Therefore, such a solution is also not optimal for a search systems.

In view of the above, the present invention provides a search system and method for facilitating retrieval additional electronic documents which applies lightweight, extraction of useful themes from un-annotated texts so that the system and method are not resource intensive, and costs increases due to the added functionality can be minimized. As explained in further detail below, the search system and method of the present invention uses text function tagging to identify related text excerpts of other relevant documents. This provides a more robust modeling of the text excerpt which had drawn the user's interest in a hit list of the SERP. These text function tags can be used, in conjunction with key search query terms and overlapping domains, to identify documents that are relevant to a particular reference document.

More specifically, it is fairly inexpensive in terms of computing resources to identify a limited number (for instance, two hundred) candidate hit documents that satisfy the keywords of the search query entered by the user. Knowing that the typical user will look only through the first top ten or twenty documents manually, the available text excerpts of the remaining identified electronic documents of the SERP can be quickly analyzed to determine which document is relevant to which of the top reference documents identified, so that these relevant documents can be displayed when the user selects a "Similar pages" hyperlink associated with a particular reference document.

Thus, as explained in further detail below, the search system and method of the present invention very quickly extracts the needed thematic elements from the additional hit documents of the SERP to identify, and associate, those documents that are very likely to be relevant to the highest ranked reference documents. The additional documents can then be displayed in response to the users' selection of the "Similar pages" hyperlink of the reference document.

In view of the foregoing, one aspect of the present invention is a search system for identifying electronic documents and for providing search results in response to a search query.

Another aspect of the present invention is a method for identifying electronic documents and for providing search results in response to a search query.

An advantage of the present invention is in providing a search system and method that recommends to the user, documents which are relevant to the document for which a "Similar pages" link is selected.

Another advantage of the present invention is in providing such a system and method that allows the relevant documents to be identified quickly, and without substantially increasing latency in generation of a search engine results page.

Still another advantage of the present invention is in providing such a system and method that is cost effective and does not require substantial increases in human and technological resources.

In accordance with one embodiment, the search system includes a user interface module that receives a search query from a user, and a search engine that accesses a corpus of electronic documents to identify a predetermined number of documents that satisfy the search query. The identified documents include predetermined number of reference documents which are a subset of the identified documents deemed by the search engine to be most relevant to the search query, and secondary documents which are not reference documents. The user interface module further generates a search engine results page in response to the search query, the search engine results page including a listing of the identified reference documents, each with a hyperlink to at least one secondary document.

In accordance with another embodiment, the search system further includes a text function tagger that parses text excerpts of the reference documents and the secondary documents, and applies text function tags to the text excerpts of the reference documents and secondary documents. The text excerpts parsed by the text function tagger may include sentences and snippets.

The search system may further include a secondary processing module that identifies those secondary documents that have a text function tag that matches a text function tag of a reference document, so that selection of a "Similar pages" hyperlink generates a display of secondary documents that are determined to at least have a text function tag that is determined to be a match with a text function tag of the reference document for which corresponding hyperlink was selected. In the above regard, the secondary processing module may be further adapted to determine whether the matching text function tags of reference document and the secondary document are for the same, or similar, word so that the display of secondary documents are limited to those secondary documents that are determined to have a text function tag that matches the text function tag of the reference document for the same or similar word.

In accordance with still another embodiment, the secondary processing module may be implemented to ignore predetermined text function tags applied by the text function tagger. In yet another embodiment, the secondary processing module may be implemented to group predetermined text function tags applied by the text function tagger so that any text function tag of a secondary document that is within the group is deemed to match any text function tag of a reference document that is also within the group. Moreover, the secondary processing module may be further adapted to refer to an electronic thesaurus or WordNet to determine whether words tagged by the text function tagger are similar, if they are not the same.

In accordance with another embodiment, a search system for identifying electronic documents stored on a computer readable media, and providing a search result in response to a search query is provided, the search system including a user interface module that receives a search query from a user, and a search engine that accesses a corpus of electronic documents to identify documents that satisfy the search query. The user interface module generates a display of a search engine results page in response to the search query, the search engine results page including a listing of a subset of the identified documents deemed by the search engine to be most relevant to the search query. Each of the listed documents have a hyperlink to at least one similar document that is relevant to the listed document corresponding to the hyperlink, the similar document being selected from the documents that satisfy the search query which were identified by the search engine.

In one embodiment, the method for identifying electronic documents and providing a search result in response to a search query includes receiving a search query, and identifying a predetermined number of documents that satisfy the search query, the predetermined number of documents including reference documents which are a subset of the identified documents that are deemed to be the most relevant to the search query, and secondary documents which are not the reference documents. The method also includes generating a search engine results page in response to the search query, the search engine results page including a listing of the identified reference documents, each with a hyperlink to at least one secondary document.

In accordance with another embodiment, the method may also include parsing text excerpts of the reference documents and secondary documents, and applying text function tags to the text excerpts of the reference documents and secondary documents. In this regard, the text excerpts parsed may include sentences and snippets. The method may further include identifying those secondary documents that have text function tags that matches a text function tag of a reference document so that upon receiving a selection of a hyperlink, a display of secondary documents is generated which are determined to at least have a text function tag that matches a text function tag of the reference document for which corresponding hyperlink was selected.

In still another embodiment, the method may include determining whether the matching text function tags of reference document and the secondary document are for the same, or similar word, and limiting the display of secondary documents to those secondary documents that are determined to have a text function tag that matches the text function tag of the reference document for the same or similar word.

In other embodiments, the method may also include ignoring predetermined text function tags applied, and/or grouping predetermined text function tags together so that any text function tag of a secondary document that is within the group is deemed to match any text function tag of a reference document that is also within the group. In addition, an electronic thesaurus or WordNet may be referenced in order to determine whether words tagged are similar, if they are not the same.

In still another embodiment, the method for identifying electronic documents and providing a search result in response to a search query includes receiving a search query from a user, accessing a corpus of electronic documents to identify documents that satisfy the search query, and generating a search engine results page in response to the search query. The search engine results page includes a listing of a subset of the identified documents deemed to be most relevant to the search query, each of the listed documents having a hyperlink to a similar document, where the similar document is selected from the identified documents that satisfy the search query.

Yet another aspect of the present invention is a computer readable media with instructions for identification of electronic documents and generation of search results in response to a search query in the manner described above relative to the search system and search method.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

Figure 1:
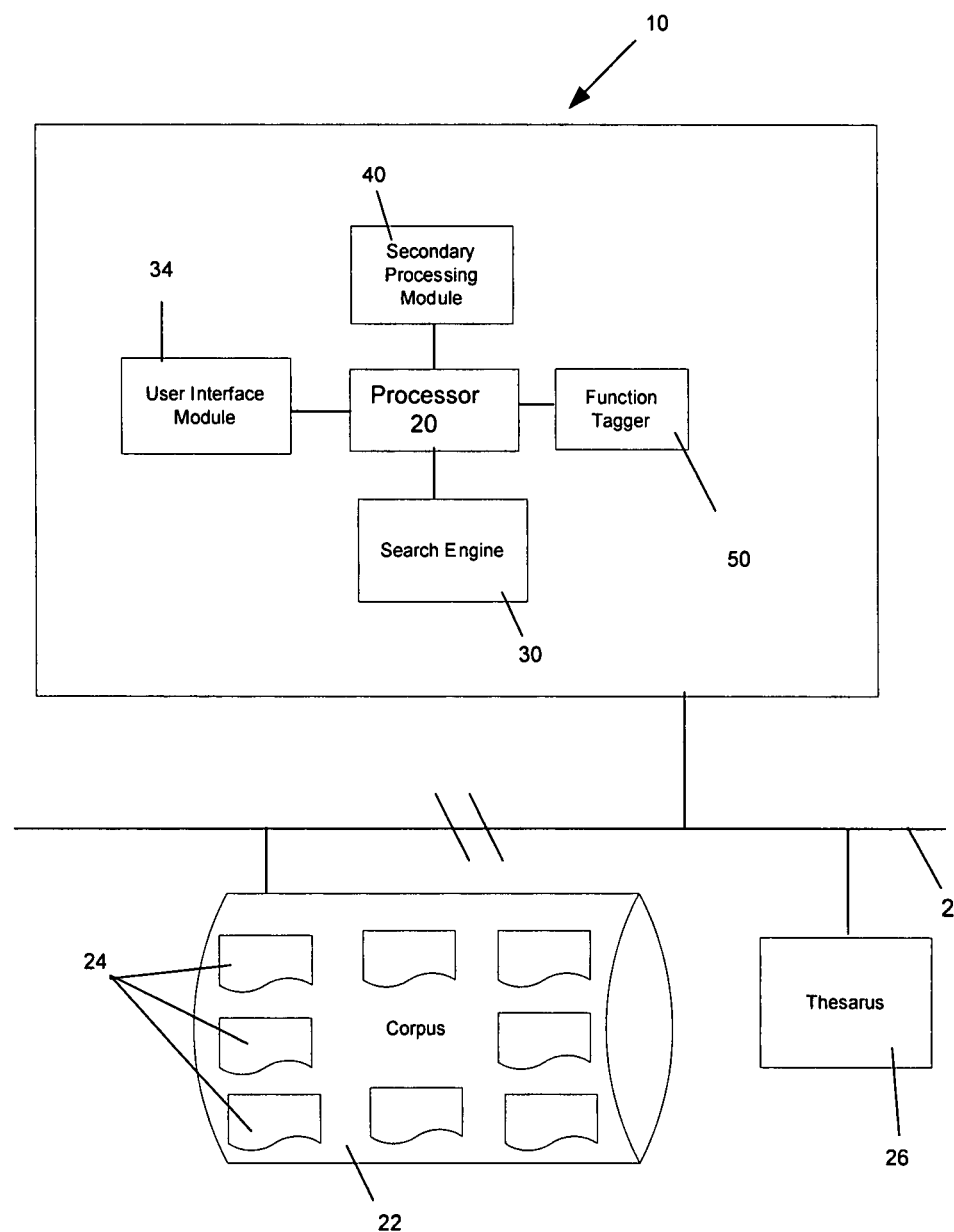
FIG. 1 is a schematic illustration of a search system in accordance with one embodiment of the present invention.

FIG. 1 illustrates a schematic view of a search system 10 in accordance with one embodiment of the present invention for searching electronic documents stored in a computer readable media, and providing a search result in a search engine results page (SERP) in response to a user search query. As explained herein below, the search system 10 of the present invention utilizes text function tagging to identify related text excerpts in the electronic documents identified by the search system 10, to thereby provide additional documents related to a particular reference document. Of course, it should be understood that as used herein, the term "document" refers to any computer readable file, regardless of format and/or length. For instance, web pages of websites, word processing documents, presentation documents, spreadsheet documents, PDF documents, etc., are all examples of electronic documents referred to herein.

It should also be understood that the search system 10 of FIG. 1 may be implemented with any type of hardware and/or software, and may be a pre-programmed general purpose computing device. For example, the search system 10 may be implemented using a server, a personal computer, a portable computer, a thin client, or any suitable device or devices. The search system 10 and/or components thereof may be a single device at a single location or multiple devices at a single, or multiple, locations that are connected together using any appropriate communication protocols over any communication medium such as electric cable, fiber optic cable, or in a wireless manner.

It should also be noted that the search system 10 in accordance with the present invention is illustrated and discussed herein as having a plurality of components or modules which perform particular functions. It should be understood that these components or modules are merely schematically illustrated based on their function for clarity purposes only, and do not necessary represent specific hardware or software. In this regard, these components or modules may be hardware and/or software implemented to substantially perform the particular functions discussed. Moreover, they may be combined together within the search system 10, or divided into additional components or modules based on the particular function desired. Thus, the present invention, as schematically embodied in FIG. 1, should not be construed to limit the search system 10 of the present invention, but merely be understood to illustrate one example implementation thereof.

Referring again to the illustrated embodiment of FIG. 1, the search system 10 includes a processor 20 that is connected to a corpus 22 having a plurality of electronic documents 24 therein. It should be evident that the corpus 22 illustrated is remotely located, and is in communication with the search system 10, via a network such as the Internet 2. Of course, in other embodiments, the corpus 22 may be provided within the search system 10 itself as a component thereof. The plurality of electronic documents 24 in the corpus 22 may be indexed in accordance with key words as known in the art, and further domain tagged to identify general domain of each electronic document 24 which corresponds to the general content or subject matter of the electronic documents. An electronic thesaurus 26, which may be Word Net, for example, is also provided.

The search system 10 is further provided with a search engine 30 which is adapted to receive a query from a user via a user interface module 34, and to search and retrieve electronic documents from the corpus 22 that satisfy the entered search query. In the illustrated embodiment, the search engine 30 may operate in a substantially conventional manner to quickly perform a keyword search to identify those documents in the corpus 22 that satisfy the received search query. The search results can be displayed to the user via the user interface module 34 in a search engine results page (SERP) with a listing of documents. The search system 10 in accordance with the illustrated embodiment of the present invention is further provided with a secondary processing module 40 and a function tagger 50, as shown in FIG. 1, the function of which are discussed in further detail below.

In accordance with one preferred embodiment, the search system 10 places a wrapper around the user's entered keyword search query to limit the domain of the documents of the search results. The search engine 30 conducts the search to initially identify a predetermined number of "hits" (i.e. documents) deemed to satisfy the entered search query within the domain. The predetermined number may be, for example, 200 hits. As noted, the search engine 30 may be implemented to search the corpus 22 in a substantially conventional manner to identify those documents that meet the requirements of the entered search query. The specific manner in which the search engine 30 executes the search is not critical to understanding, or implementing, the present invention, and any appropriate search methods and techniques may be used. Thus, discussions related to the actual searching for documents satisfying the search query by the search engine 3.0 is omitted herein. However, the identified documents of the search results are typically ranked sequentially by the search engine based on relevance (as determined by the search engine). This ranking may be reflected merely by the ordering of the identified documents with the most relevant document being first, or be explicitly enumerated. This feature is used by the search system 10 as described in detail herein below.

As used and referred to herein, the term "reference document" refers to a subset of the identified documents that have been identified by the search engine 30, as being the most relevant to the search query, i.e. top ranked documents. As noted, for conventional search engines, search results are typically provided in a sequential listing, the document deemed to be most relevant being displayed first (and optionally, enumerated 1), second most relevant being displayed second (and optionally, enumerated 2), etc. Correspondingly, in the above example where the search engine 30 initially identifies 200 documents that satisfy the search query, first identified documents 1-20 for example, can be considered the reference documents.

The remaining documents identified by the search engine 30 that are not reference documents are referred to herein as "secondary documents". Thus, in the above example where 200 documents are initially identified by the search engine 30, and top 20 are considered to be reference documents, the remaining documents 21-200 would be considered secondary documents. Of course, the specific number of total documents and the reference documents are merely provided herein as examples to facilitate understanding of the present invention, and the present invention is not limited to the specific example described and other number of documents and reference documents may be used. This described distinction between the reference documents and secondary documents is important in the implementation of the preferred embodiment of the search system 10 in displaying the search results in a SERP to the user via the user interface module 34, as explained in further detail below.

In the preferred implementation, instead of displaying all of the identified documents of the search result returned by the search engine 30, or displaying the entire predetermined number of identified documents (for example, 200 documents) in a SERP for the user, the preferred embodiment of the search system 10 utilizes the secondary processing module 40 and the text function tagger 50 to further process the predetermined search results obtained by the search engine 30. In particular, the text function tagger 50 of the search system 10 executes a rule-based, partial parse, on the text excerpts such as sentences and snippets of each identified document including the reference documents and secondary documents, and provides a variety of speech-act and assertion-type function tags for these text excerpts. These text function tags applied can include <Interrogative>, <Supporting example>, <Description>, <Definition>, <Warning>, <Emphasis>, <Inference>, <Quantification>, <Avoidance goal>, <Diminution>, <Contributory cause>, <Logical connection>, and <Causal connection> tags, and so forth.

The secondary processing module 40 in accordance with the present invention then analyzes the tags for each of the documents to determine which of the secondary documents identified are related to, and are "more like," the reference documents, i.e. top 20 documents in the above example. The secondary processing module 40 identifies those secondary documents that have the same text function tags with one or more reference documents, and associates them together, the details of which are described in further detail in the examples discussed below. Since the text function tags are domain-independent and are not content based, they provide a sufficient means for identifying, across a broad range of topics, several good modeling characteristics for the text excerpt in which the key search terms were found.

Once the secondary documents are matched (if possible) with a corresponding reference document(s), the search system 10 in accordance with the preferred embodiment of the present invention displays the reference documents in the SERP via the user interface module 34, for example, top 20 reference documents. In addition, a "Similar pages," "More like this," or similar hyperlink is displayed for the reference documents (if available) which upon selection by the user via the user interface module 34, displays the identified secondary documents (if any) that were determined by the secondary processing module 40 to be relevant and matches to the reference document for which the hyperlink was selected.

Figure 2:
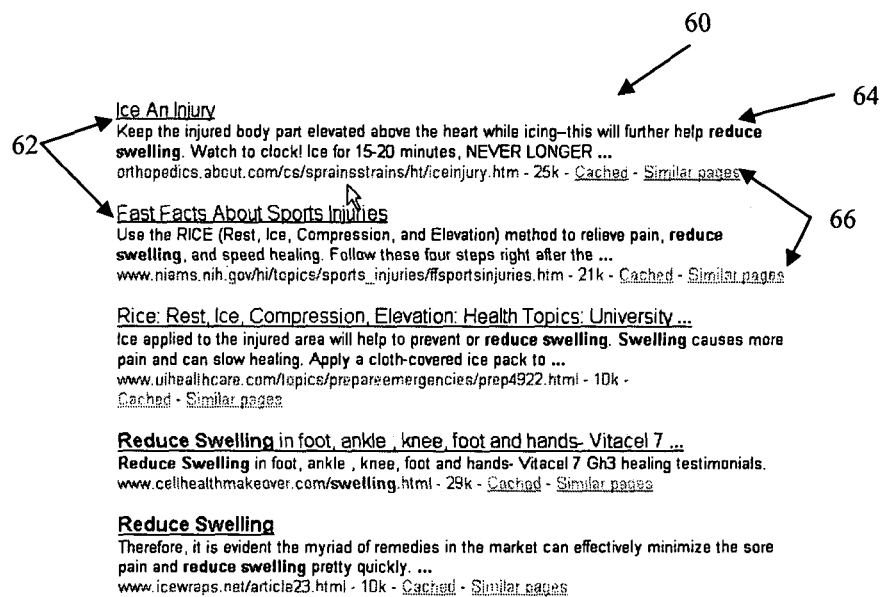
FIG. 2 is a schematic illustration of a portion of a search engine search results page having "Similar pages" hyperlink.

FIG. 2 shows a portion of a SERP 60 that lists the top reference documents 62 identified by the search engine 30 in response to the search query "reduce swelling." Thus, the search engine 30 has determined that these documents satisfy the search query, with the first identified document entitled "Ice An Injury" being determined by the search engine 30 as being most relevant to the search query. Of course, the portion of SERP 60 illustrated merely shows five reference documents, but SERP can be implemented to show any desired number of reference documents in other implementations, for example, 30 reference documents. As can be seen, each of the reference documents 62 is implemented as a hyperlink to the document, and a brief text excerpt 64, including a sentence and snippet of the document 62, is provided beneath the title of the document.

Furthermore, each of the reference documents 62 identified on the SERP 60 is provided with a "Similar pages" hyperlink 66 which can be selected by the user to display the secondary references associated with the particular reference document for which the hyperlink is selected. These secondary references are identified by the search system 10 using the text function tagger 50 and the secondary processing module 40, these components functioning in the manner described to identify matching secondary documents that are more relevant to the reference document than those provided by conventional search systems. Of course, such retrieved secondary references may be displayed to the user via the user interface module 34 in any appropriate manner, for example, in a sequenced listing in the manner similar to the SERP 60.

An important factor to consider in implementing the present invention is the fact that many parsers and semantic role analyzers expect full sentences that are largely grammatical. Whereas typical search results can include text excerpts with full sentences for the documents identified as satisfying the search query keywords, many bear only short excerpts of text which are really just snippets of sentences. This is evidenced by the text excerpts 64 shown in the documents identified in SERP 60 discussed above relative to FIG. 2 which include sentences and snippets. The function tagger 50 of the search system 10 is implemented to analyze these text excerpts in the identified documents to apply the text function tags.

In addition, the above described tagging by the function tagger 50, and analysis by the secondary analysis module 40, must be executed very quickly so that hyperlinks to the related secondary documents can be displayed in the SERP for the user, preferably in real time. In this regard, the functional tagging performed by the text function tagger 50 of the preferred embodiment can be quickly executed without requiring intensive computational resources since it is not performing a full parse, not analyzing all documents satisfying the search query, and not analyzing more than a small set of semantic elements.

In validating one implementation of the search system 10 in accordance with the present invention schematically illustrated in FIG. 1, a lightweight function tagger named "SIFT" (Sentence Intentional Function Tagger) available by license from Musgrove Technologies Enterprises, LLC. of Morgan Hill, Calif. was used for the function tagger 50. The SIFT tagger was found to perform the desired partial parsing well for full sentences, and fairly well on mere snippets of sentences which are common in the search results returned by conventional search engines. The partial parsing was also performed very quickly by the SIFT tagger which confirms that such text function tagging can be performed in real-time, without adding user noticeable latency in providing the search results in a SERP.

In utilizing SIFT tagger for the function tagger 50, it was found that some of the function tags produced were more useful than others. For example, <Quantification> and <Description> tags, while intellectually interesting, were not particularly helpful for determining relevance of a secondary document to a reference document. These function tags are too easy to satisfy, and snippets bearing no special relevance could easily exhibit these features. On the other hand, function tags such as <Causal connection>, <Avoidance goal>, <Diminution> and <Warning> as provided by the SIFT tagger were found to be very helpful. Correspondingly, rules were implemented for the secondary processing module 40 to ignore, and not analyze for, those function tags found to be of little value.

In addition, it should be noted that same word may serve differing functions in different text excerpts, depending on the context in which the word is used. Correspondingly, the application of the text function tags by the SIFT tagger were implemented to account for such differing functions for the same word. For instance, the SIFT tagger was implemented to examine the structure of the text excerpt, and apply the appropriate text function tag based on the context in which a particular word is used in the text excerpt.

For example, in the text excerpt "rust makes gears become sticky", the word "make" is used in a text excerpt having the structure "make [noun phrase] become [adjective]," the structure indicating the context in which the word "make" is used. Thus, in this context, the text excerpt was applied with a text function tag <Efficient causality> by the SIFT. However, in the text excerpt "oil and vinegar makes a basic salad dressing", the text excerpt has a structure "[noun phrase] and [noun phrase] makes [noun phrase]," the structure indicating a different context in which the word "make" is used. In this context, the text excerpt was applied with a text function tag <Material causality> by the SIFT tagger.

Thus, the above examples illustrate the added level of analysis that can be implemented in the function tagger 50 to increase the tagging accuracy and increase the likelihood that documents identified as being relevant based on matching text function tags are indeed, relevant to each other. In addition, these examples further illustrate that the text function tags can be arranged hierarchically by the function tagger 50, for example, text function tags <Efficient causality> and <Material causality> being specific forms or subset of the general text function tag <Causal connection> for the SIFT tagger example implementation.

Furthermore, a rule that instructs the secondary processing module 40 to group together certain similar function tags used by the SIFT tagger was found to be helpful, for example, grouping <Contributory cause>, <Logical connection>, and <Causal connection> tags. Such a grouping was treated disjunctively in order to widen the pool of eligible text excerpts from the documents that match one another, and was found to be important in obtaining a respectable coverage rate. For example, for a given text excerpt having a <Causal connection> functional tag, there may be only a single snippet exhibiting the same feature tag in the documents analyzed. However, when including text excerpts that also had <Logical connection> or <Contributing cause> functional tags the pool of documents having one of these other grouped functional tags increased, correspondingly increasing the pool of secondary documents that may be deemed relevant to a particular reference document. This was observed in many instances.

However, after widening the pool in the above described manner with application of a grouping rule, narrowing the pool in a different respect was also found to be desirable exclude documents that may not be relevant to a particular reference document. Namely, for some function tags, unless the text excerpts had semantically similar text elements addressed by their common function, they were not as likely to be relevant to one another. In other words, even if the sentence or snippet may have the same function tags, they may not be relevant to one another unless the common function tags was associated with the same, or similar, words of the sentence or snippet.

For example, while there was obvious relevance between a sentence asserting a causal connection pertaining to "pain," and another sentence establishing a causal connection pertaining to "hurt", neither of these were relevant to a sentence ascribing causality to something else unrelated to hurt or pain, for instance, rule changes in a sport. Thus, in some cases, having the same common text function tag in the text excerpt was not enough, but a rule requiring a stronger match was desirable to establish relevancy between the documents. For instance, additional rules for the function tagger 50 were implemented so that for certain specific function tags, the function should apply to either a shared topic word (a word found in the topic name or one of its aliases, after stemming), a query word, or another similar word (or synonym or hyponym) that occurred in both text excerpts.

Thus, in order to satisfy the stronger matching requirements, the sentences or snippets of the search results should have the same function tag connected with the query word or one of the topic words. If the same function was connected to differing words, the secondary processing module 40 was implemented to refer to the electronic thesaurus 26 or Word Net to check if there was close semantic distance (for example, synonymy or hyponymy) between words of the two corresponding text excerpts commonly tagged by the function tagger 50.

For example, for a search query "serious head injury" submitted to the search engine 30 via the user interface module 34, two of the search results included sentences with the search query keyword "head" exhibiting the <Emphasis> function tag for text elements "serious" and "severe". These sentences, and correspondingly, the two documents with the common function tag, were deemed a strong match, given that WordNet lists "severe" as a synonym for "serious." This is opposed to other words that could have manifested the <Emphasis> function tag such as "especially," which is not a synonym for "serious" or "seriously". Therefore, in such an instance, a strong match would not be found and these documents would not be deemed to be of sufficient relevance to one another for inclusion in identification of additional related documents upon selection of a "Similar pages" hyperlink.

To further demonstrate the operation of the search system 10 in accordance with the present invention, processing of two example search queries are discussed herein below that illustrate the operation of the secondary processing module 40 and function tagger 50 which were implemented with the above described rules.

Example 1

Search query terms "reduce swelling" are entered by the user of the search system 10 via the user interface module 34. The search engine 30 performs a search to identify the top 200 documents in the corpus 22 that satisfy the search query. The documents identified in the search results are parsed by the function tagger 50 to tag the words of the text excerpts based on their function. The documents are then analyzed by the secondary processing module 40 to determine which of the secondary documents ranked 21 to 200 identified by the search engine 30 have the same function tags as the reference documents ranked 1 to 20 so that the matching secondary documents can be displayed for the correspondingly matched reference document if the "Similar pages" hyperlink is selected on the SERP.

For the search query noted above, one of the top 20 documents, for example, reference document 15 may have the sentence: "Numerous methods to reduce knee swelling have been advocated, including elevation of the limb, ice therapy, Quadriceps muscle exercises, massage and electrotherapy treatment." The secondary document ranked 151 may include the sentence: "Once the doctor knows the full extent of your injury, he or she usually will start with conservative treatment techniques such as rest and ice to help decrease swelling."

The function matching process of the above noted sentences between the reference document 15 and document 151 can be understood as follows:

<Diminution> tag is applied to reference sentence of document 15 by the function tagger 50 for having "reduce" connected to "knee swelling";

<Diminution> tag is applied to the matched sentence of document 151 by tagger 50 for having "decrease" connected to "swelling";

The secondary processing module 40 analyzes the documents and recognizes that document 15 and 151 have the same text function tags, but that the words associated with the tags are different, i.e. key word "reduce" of reference document 4 is different than "decrease" of the secondary document 151;

The secondary processing module 40 references the electronic thesaurus 26 (for example, Word Net) to determine that "reduce" is a hyponym of "decrease"; and Thus, the secondary processing module 40 determines that a strong match exists between the reference document 15 and the secondary document 151, and that the secondary document 151 should be identified and displayed for the user upon user's selection of "Similar pages" hyperlink associated with the reference document 15.

Of course, above Example 1 demonstrates matching of one reference document and one secondary document. The secondary processing module 40 and the function tagger 50 of the search system 10 in accordance with the present invention would processes all of the predetermined number documents in the search results returned by the search engine 30 (for example, top 200 in the above example), to determine those secondary documents that are relevant to one or more of the predetermined number of reference documents.

As also previously explained, the search system 10 in accordance with the preferred embodiment of the present invention is implemented so that only the reference documents, which are a limited subset of the identified documents, are displayed for the user in the SERP, for example, documents ranked 1 to 20. These reference documents are provided with the "Similar pages" link that, upon selection, displays a listing of the secondary documents determined to be a match to the corresponding reference document.

Referring again to the above Example 1, another document, for instance, secondary document 90, may have a sentence: "Some otolaryngologist-head and neck specialists set fractured bones right away before swelling develops, while others prefer to wait until the swelling is gone." This sentence of the secondary document 90 would fail the text function match since it does not have the same function tag connected with the query word or one of the topic words as the sentence of reference document 15. Therefore, in such an instance, a strong match is not found and documents 15 and 90 are deemed to not be of sufficient relevance to one another, and secondary document 90 would not be identified for inclusion in a display of related documents upon selection of a "Similar pages" hyperlink for reference document 15.

Example 2

In a similar manner, in response to a search query "concussion injury", the search engine 30 identifies 200 documents that satisfies the search query. One of the reference documents, for example, reference document 12 may have the sentence: "The damage caused after one concussion is often reversible after an appropriate recovery time, but if a second injury is sustained before then, the damage can be devastating." Another document, for example, secondary document 22, may have a sentence: "Every head injury should be taken seriously and it is important to understand that the damage done by multiple concussions can be cumulative."

The function matching process of the above noted sentences of reference document 12 and secondary document 22 can be understood as follows:

- <Repetition> tag is applied by the text function tagger 50 to the sentence of document 12 for having "second injury" connected to "concussion";
- <Repetition> tag is applied by the function tagger 50 to the sentence of document 22 for having "multiple" connected query-word "concussions";
- The secondary processing module 40 analyzes the documents and recognizes that document 12 and 22 have the same text function tags, but that the words are different;
- The secondary processing module 40 references thesaurus 26 (such as Word Net) to determine that "second" is a hyponym of "multiple"; and
- Thus, the secondary processing module 40 determines that a strong match exists between reference document 12 and secondary document 22, and that secondary document 22 should be identified and displayed for the user upon user's selection of "Similar pages" hyperlink associated with the reference document 12.

A candidate sentence of another secondary document, for example, secondary document 40 identified by the search engine 30 as satisfying the search query, but which fails to function-match may be: "A concussion is a violent jarring or shock to the head that causes a temporary jolt to the brain." This sentence would fail since it would not have a <Repetition> tag. In the above examples, it is important to note how the failed sentences are less relevant to the example sentences of the reference documents, despite belonging to the relevant topical domain, and despite containing the search query word, thereby satisfying the search query.

Figure 3:
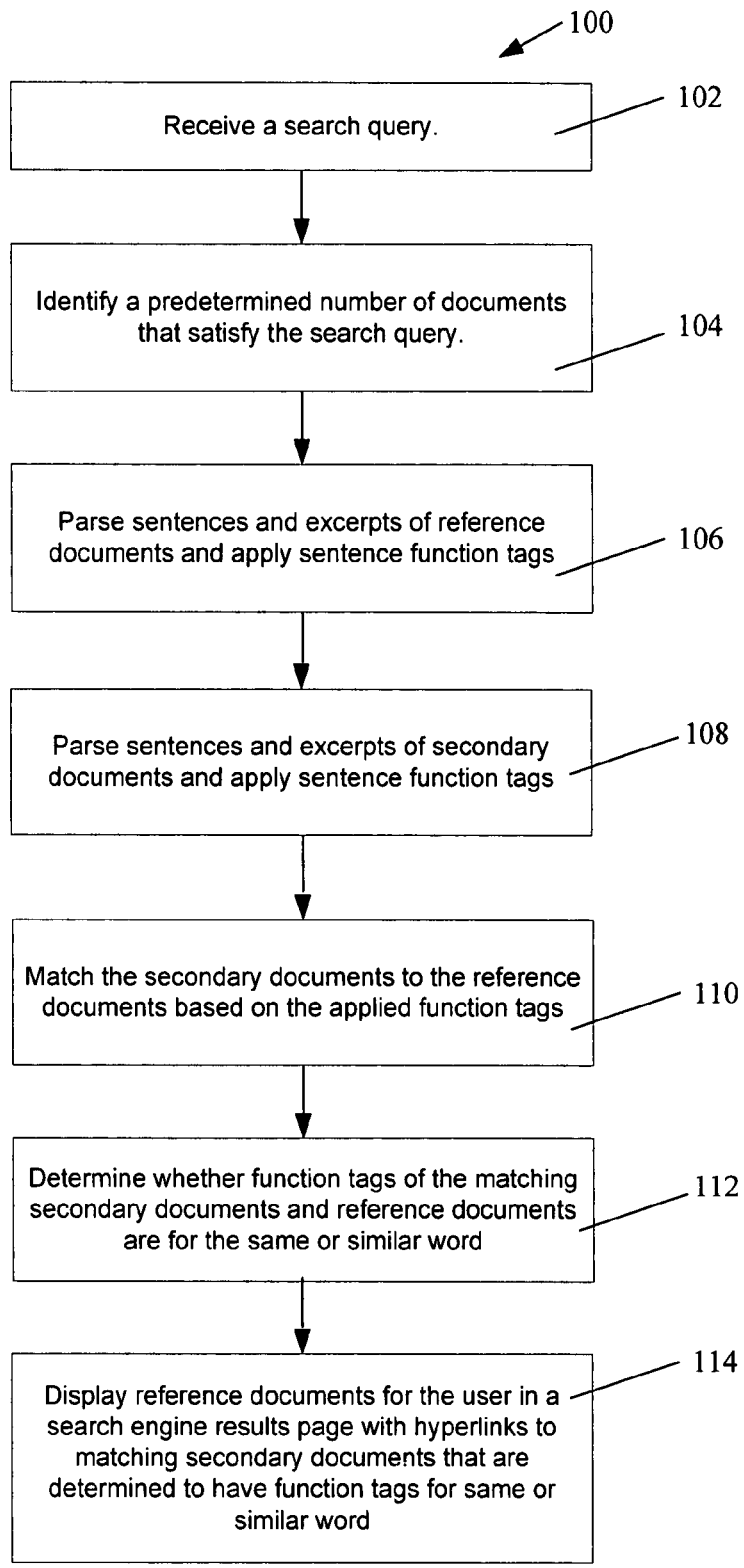
FIG. 3 is a flow diagram illustrating a method in accordance with one embodiment of the present invention.

FIG. 3 is a flow diagram 100 that schematically illustrates one example embodiment of a method in accordance another aspect of the present invention. As can be seen, the method of the present invention includes receiving a search query in step 102, and identifying a predetermined number of documents that satisfy the search query in step 104. As explained above, the predetermined number of documents is limited so that processing and analysis can be executed rapidly. In addition, the identified documents include reference documents which are a subset of the identified documents that are deemed to be the most relevant to the search query, the remaining identified documents being secondary references.

In step 106, text excerpts such as sentences and snippets of reference documents are parsed, and text function tags are applied thereto, while in step 108, text excerpts of secondary documents are parsed, and text function tags are applied thereto. In addition, the method of the illustrated embodiment also includes matching the secondary documents to the reference documents in step 110 based on the applied function tags. A rule is then applied to determine whether function tags of the matching secondary documents and reference documents are for the same or similar word in step 112. As explained above, this may be attained by referencing an electronic thesaurus or WordNet. In step 114, the reference documents are displayed for the user in a SERP with hyperlinks to matching secondary documents that are determined to have function tags for the same, or similar, word.

Of course, the above described method is merely one example implementation, and may be implemented differently in other embodiments. For example, as previously noted, certain tags may be ignored while other tags may be grouped together to increase the likelihood of matching, and thus, increase the pool of potentially relevant secondary documents. Furthermore, in other embodiments, the SERP may initially be displayed with hyperlinks which are not yet functional so that the user can be immediately provided with search results. The tagging and secondary analysis of matching, grouping, etc. as described above may be performed in the background, and associated with the corresponding hyperlinks subsequently. This would allow larger number of reference documents to be initially displayed to the user without increased latency compared to conventional search systems.

Finally, as noted previously, another aspect of the present invention is in providing a computer readable media with instructions for identifying of electronic documents and generating search results in response to a search query in the manner described above. In this regard, the computer readable media in accordance with the present invention may include instructions for implementing the search system of the present invention, and/or for facilitating execution of the method of the present invention as described.

To further validate the value of the present system and method in providing more relevant secondary references to users, a resultant sample set of function-matched sentences were shown to a number of participants in a small survey after tailoring the implementation of the search system 10 using the rules described above. The sentences were presented as triples of sentences, each triple including a reference sentence followed by a pair of sentences from topic-related documents. One of the candidate sentences was selected by the function-matching method described above using text function tags, while the other sentence was selected merely by keyword match in the conventional manner. Participants were asked to select whether one sentence or the other was more "relevant" to the reference sentence. Participants also had the option of indicating that both sentences were equally relevant, or that neither sentence was relevant to the reference sentence.

Out of the sample of possible sentence pairs, the following survey results were obtained:

| Text function tag matched sentence deemed more relevant: | Keyword matched sentence deemed more relevant: | Both sentences deemed equally relevant: | Neither sentence deemed relevant: |
|---|---|---|---|
| 57% | 10% | 27% | 7% |

There are two interesting observations from these results. First, in a very large portion of cases (43%), there was no benefit to text function tag matching because sentences that used such text function tag matching were deemed either to be irrelevant, less relevant, or no more relevant, than a simple keyword matched sentence. However, in cases where one sentence was deemed better, the text function tag matched sentence was almost always selected by the user as being more relevant, being favored 57% of the time, as opposed to only 10% of the time for simply keyword matched sentences. This clearly indicates that the text function tag matching as described above would seldom result in less relevant documents, and around half the time, it would help to provide more relevant documents.

The overall accuracy of the search system 10 in accordance with the present invention was also examined. The precision (percentage of retrieved documents which are actually relevant) of the search system 10 was observed to be approximately 83%. To determine recall (percentage of relevant documents retrieved from the total number of relevant documents available), over 300 sample sentences were examined against a smaller set of reference sentences. After tagging all sample sentences deemed relevant to one of the reference sentences, the system implementing text function tag matching was found to have a 68% recall rate. In contrast, keyword matching alone produced 88% recall, but only 37% precision on the same sample. Thus, whereas recall was slightly reduced by the text function tagging method of the present invention, the precision is substantially increased. The harmonic means of precision and recall (a.k.a. f-measures) for text function tag matched sentences were 0.75 and 0.52, respectively.

In view of the above, in an environment that requires rapid generation and display of SERPs, the search system and method of the present invention can be implemented to recommend sentence-level relevant documents that are relevant to reference documents by using a lightweight function tagger. Thus, the search system and method of the present invention can substantially improve precision in identifying relevant documents than conventional search systems that rely merely on matching on keywords, albeit with somewhat lower recall. The above described results demonstrate that contextually relevant hits of the search results can be used to automatically suggest documents related to other documents of the search results based on sentence-level clues, provided that there is a sufficient overlap in their sentential functions, and a large enough pool of excerpts for the system to examine is provided.

Therefore, in view of the above, it should be evident to one of ordinary skill in the art how the search system and method of the present invention addresses the limitations of conventional search engines, and "Similar pages" feature used in such conventional search engines. In particular, it should be evident that the search system and method of the present invention quickly, and cost effectively, identifies and recommends to the user, documents which are relevant to a selected reference document.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

I claim:

1. A computer system for identifying electronic documents stored on a computer readable media, and providing a search result in response to a search query, comprising:

a processor in communication with the computer readable media, the processor comprising:
 a user interface module that receives a search query from a user;
 a search engine that accesses a corpus of electronic documents to identify a predetermined number of documents that satisfy the search query, the identified documents including a predetermined number of reference documents which are a subset of the identified documents deemed by the search engine to be most relevant to the search query and secondary documents;
 a text function tagger that parses text excerpts of the identified documents and applies text function tags to the text excerpts of the identified documents, wherein the text function tags identify semantic roles of the text excerpts; and
 a secondary processing module that identifies the secondary documents that have a text function tag that matches a text function tag of a reference document,
 wherein the user interface module further generates a search engine results page in response to the search query, the search engine results page including a listing of the identified reference documents, each with a hyperlink to at least one secondary document identified by the secondary processing module as having a matching text function tag.

2. The computer system of claim 1, wherein selection of a hyperlink generates a display of the at least one secondary document.

3. The computer system of claim 2, wherein the secondary processing module is further adapted to determine whether the matching text function tags of reference document and the secondary document are for the same or similar word.

4. The computer system of claim 3, wherein the display of secondary documents are limited to those secondary documents that are determined to have a text function tag that matches the text function tag of the reference document for the same, or similar, word in the text excerpt.

5. The computer system of claim 1, wherein the text excerpts parsed by the text function tagger include sentences and snippets.

6. The computer system of claim 1, wherein the secondary processing module is further adapted to ignore predetermined text function tags applied by the text function tagger.

7. The computer system of claim 1, wherein the secondary processing module is further adapted to group predetermined text function tags applied by the text function tagger so that any text function tag of a secondary document that is within the group is deemed to match any text function tag of a reference document that is also within the group.

8. The computer system of claim 1, wherein the secondary processing module is further adapted to refer to an electronic thesaurus or WordNet to determine whether words tagged by the text function tagger are similar if they are not the same.

9. The computer system of claim 1, wherein the text function tags applied by the text function tagger includes at least one of <Interrogative>, <Supporting example>, <Description>, <Definition>, <Warning>, <Emphasis>, <Inference>, <Quantification>, <Avoidance goal>, <Diminution>, <Contributory cause>, <Logical connection>, and <Causal connection> tags.

10. A computer system for identifying electronic documents stored on a computer readable media, and providing a search result in response to a search query, comprising:

a processor in communication with the computer readable media, the processor comprising:
a user interface module that receives a search query from a user; and
a search engine that accesses a corpus of electronic documents to identify documents that satisfy the search query;
wherein the user interface module further generates a display of a search engine results page in response to the search query, the search engine results page including a listing of a subset of the identified documents deemed by the search engine to be most relevant to the search query, each of the listed documents having a hyperlink to at least one similar document identified using text function tags, wherein the text function tags identify semantic roles of the identified documents and the similar documents, the similar document being selected from the documents that satisfy the search query which were identified by the search engine.

11. A method for identifying electronic documents stored on a computer readable media, and providing a search result in response to a search query, comprising:
receiving a search query;
identifying a predetermined number of documents that satisfy the search query, the predetermined number of documents including reference documents which are a subset of the identified documents that are deemed to be the most relevant to the search query and secondary documents;
parsing text excerpts of the identified documents and applying text function tags to the text excerpts, wherein the text function tags identify semantic roles of the text excerpts;
identifying the secondary documents that have text function tags that match the text function tags of a reference document; and
generating a search engine results page in response to the search query, the search engine results page including a listing of the identified reference documents, each with a hyperlink to at least one secondary document, the at least one secondary document being a secondary document that has a text function tag that matches a text function tag of the reference document.

12. The method of claim 11, further including receiving a selection of a hyperlink, and generating a display of the at least one secondary document.

13. The method of claim 12, further including determining whether the matching text function tags of reference document and the secondary document are for the same or similar word.

14. The method of claim 13, further including limiting the display of secondary documents to those secondary documents that are determined to have a text function tag that matches the text function tag of the reference document for the same or similar word.

15. The method of claim 11, wherein the text excerpts parsed include sentences and snippets.

16. The method of claim 11, further including ignoring predetermined text function tags.

17. The method of claim 11, further including grouping predetermined text function tags together so that any text function tag of a secondary document that is within the group is deemed to match any text function tag of a reference document that is also within the group.

18. The method of claim 11, further including referencing an electronic thesaurus or WordNet to determine whether words tagged are similar if they are not the same.

19. The method of claim 11, wherein the text function tags applied includes at least one of <Interrogative>, <Supporting example>, <Description>, <Definition>, <Warning>, <Emphasis>, <Inference>, <Quantification>, <Avoidance goal>, <Diminution>, <Contributory cause>, <Logical connection>, and <Causal connection> tags.

20. A method for identifying electronic documents stored on a computer readable media, and providing a search result in response to a search query, comprising:
receiving a search query from a user;
accessing a corpus of electronic documents to identify documents that satisfy the search query; and
generating a search engine results page in response to the search query, the search engine results page including a listing of a subset of the identified documents deemed to be most relevant to the search query, each of the listed documents having a hyperlink to a similar document identified using text function tags, wherein the text function tags identify semantic roles of the identified documents and the similar documents;
wherein the similar document is selected from the identified documents that satisfy the search query.

21. A computer readable storage medium with executable instructions for identifying electronic documents stored on a computer readable media, and providing a search result in response to a search query, comprising:
instructions for receiving a search query;
instructions for identifying a predetermined number of documents that satisfy the search query, the predetermined number of documents including reference documents which are a subset of the identified documents that are deemed to be the most relevant to the search query and secondary documents;
instructions for parsing text excerpts of the identified documents and applying text function tags to the text excerpts, wherein the text function tags identify semantic roles of the text excerpts;
instructions for identifying the secondary documents that have text function tags that match the text function tags of a reference document; and
instructions for generating a search engine results page in response to the search query, the search engine results page including a listing of the identified reference documents, each with a hyperlink to at least one secondary document, the at least one secondary document being a secondary document that has a text function tag that matches a text function tag of the reference document.

22. The computer readable storage medium of claim 21, further including instructions for receiving a selection of a hyperlink, and instructions for generating a display of the at least one secondary document.

23. The computer readable storage medium of claim 22, further including instructions for determining whether the matching text function tags of reference document and the secondary document are for the same or similar word.

24. The computer readable storage medium of claim 23, further including instructions for limiting the display of secondary documents to those secondary documents that are determined to have a text function tag that matches the text function tag of the reference document for the same or similar word.

25. The computer readable storage medium of claim 21, wherein the text excerpts parsed include sentences and snippets.

26. The computer readable storage medium of claim 21, further including instructions for ignoring predetermined text function tags applied.

27. The computer readable storage medium of claim 21, further including instructions for grouping predetermined text function tags together so that any text function tag of a secondary document that is within the group is deemed to match any text function tag of a reference document that is also within the group.

28. The computer readable storage medium of claim 21, further including instructions for referencing an electronic thesaurus or WordNet to determine whether words tagged are similar if they are not the same.

29. The computer readable storage medium of claim 21, wherein the text function tags applied includes at least one of <Interrogative>, <Supporting example>, <Description>, <Definition>, <Warning>, <Emphasis>, <Inference>, <Quantification>, <Avoidance goal>, <Diminution>, <Contributory cause>, <Logical connection>, and <Causal connection> tag.

30. A computer readable storage medium with executable instructions for identifying electronic documents stored on a computer readable media, and providing a search result in response to a search query, comprising:

instructions for receiving a search query from a user;

instructions for accessing a corpus of electronic documents to identify documents that satisfy the search query; and instructions for generating a search engine results page in response to the search query, the search engine results page including a listing of a subset of the identified documents deemed to be most relevant to the search query, each of the listed documents having a hyperlink to a similar document identified using text function tags, wherein the text function tags identify semantic roles of the identified documents and the similar documents;

wherein the similar document is selected from the identified documents that satisfy the search query.

* * * * *